United States Patent
Giacomini

(10) Patent No.: US 9,561,712 B2
(45) Date of Patent: Feb. 7, 2017

(54) MOTOR VEHICLE PROTECTION SYSTEM

(71) Applicant: ZELIG—SERVIÇ OS DE CONSULTADORIA LDA, Funchal, Madeira (PT)

(72) Inventor: Pio Guido Giacomini, Massagno (CH)

(73) Assignee: ZELIG—SERVIÇ OS DE CONSULTADORIA LDA, Funchal, Madeira (PT)

( * ) Notice: Subject to any disclaimer, the term of this patent is extended or adjusted under 35 U.S.C. 154(b) by 0 days.

(21) Appl. No.: 14/789,203

(22) Filed: Jul. 1, 2015

(65) Prior Publication Data

US 2016/0001647 A1    Jan. 7, 2016

(30) Foreign Application Priority Data

Jul. 2, 2014  (PT) ......................................... 107746

(51) Int. Cl.
*B60J 11/04*  (2006.01)

(52) U.S. Cl.
CPC ...................................... *B60J 11/04* (2013.01)

(58) Field of Classification Search
CPC .............. B60J 11/04; B60J 11/06; B60J 11/08
USPC ...... 150/166, 168; 296/136.97, 136.98, 136.1
See application file for complete search history.

(56) References Cited

U.S. PATENT DOCUMENTS

| | | | | |
|---|---|---|---|---|
| 1,584,518 A | * | 5/1926 | Drake | B60N 2/6027 150/166 |
| 4,355,839 A | * | 10/1982 | Rosen | B60R 25/00 150/166 |
| 4,589,459 A | * | 5/1986 | Lantrip | B60J 11/06 150/166 |
| 4,799,728 A | * | 1/1989 | Akers | B60J 11/00 160/370.21 |
| 4,952,007 A | | 8/1990 | Shahrokh | |
| 5,161,849 A | * | 11/1992 | Holland, Jr. | B60J 11/00 116/28 R |
| 5,479,137 A | * | 12/1995 | Harford | H03B 5/1221 327/560 |
| 6,099,067 A | | 8/2000 | Butterworth | |

(Continued)

FOREIGN PATENT DOCUMENTS

CN       201472126        5/2010

OTHER PUBLICATIONS

Search Report issued in corresponding Portuguese Patent Application No. 107746, filed Jul. 2, 2014.

*Primary Examiner* — Sue A Weaver
(74) *Attorney, Agent, or Firm* — Lucas & Mercanti, LLP

(57) ABSTRACT

A motor vehicle protection system suitable for large-size cars such as sport utility vehicles (SUV), is disclosed. The protection system includes a cover sheet adapted to be anchored on a motor vehicle so as to cover the motor vehicle body which has a roof and two opposite sides, on each of which at least one window is present. The motor vehicle protection system cover sheet has at least one supplementary traction appendage having a first end constrained to the sheet and a second end adapted to be fixed through coupling means on the body so as to put in traction the portion of the sheet intended to cover the roof of the motor vehicle downwards. The supplementary traction appendage extends starting from the sheet so as to be interposed between the body and the sheet.

4 Claims, 2 Drawing Sheets

(56) References Cited

U.S. PATENT DOCUMENTS

2006/0109093 A1* 5/2006 Krohn ................... B60R 25/10
340/427
2010/0096052 A1* 4/2010 Graham ................. B60J 11/00
150/166

* cited by examiner

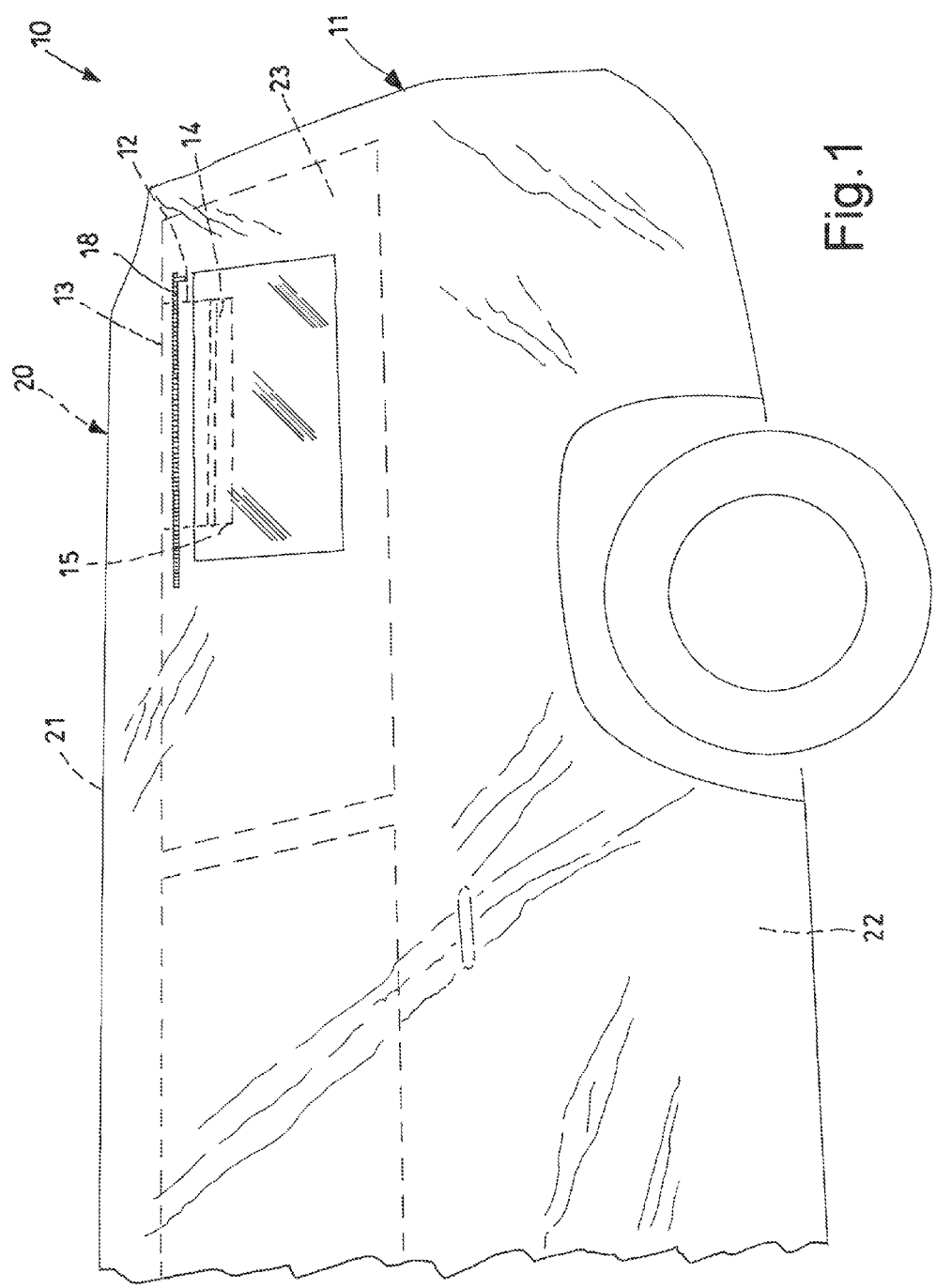

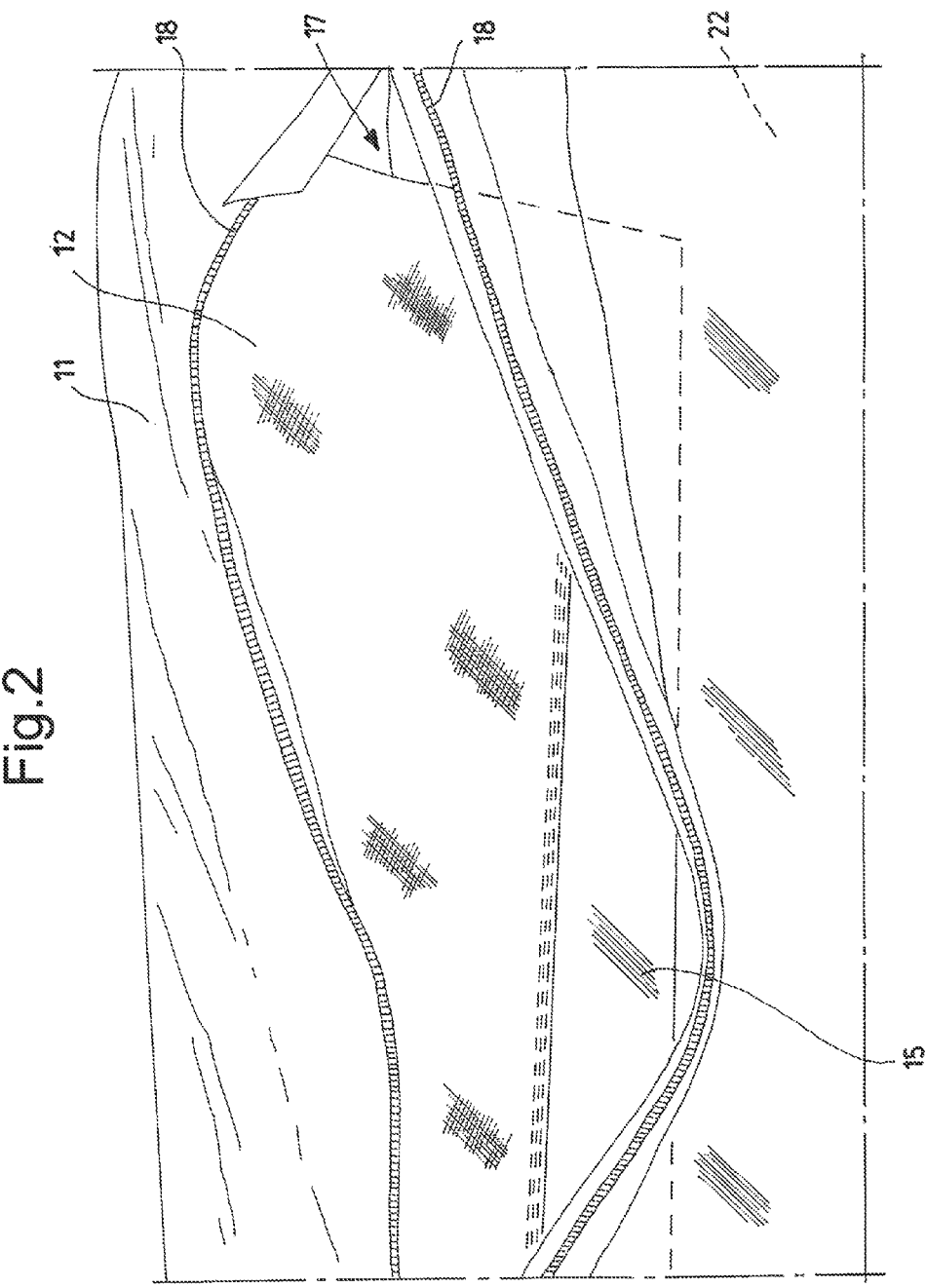

MOTOR VEHICLE PROTECTION SYSTEM

CROSS-REFERENCE TO RELATED APPLICATIONS

This application claims the benefit of priority from Portuguese Patent Application No. 107746, filed on Jul. 2, 2014, the contents of which are incorporated herein by reference.

FIELD OF THE INVENTION

The present invention refers to a motor vehicle protection system, in particular for large-size cars such as for example the so-called sport utility vehicles (SUV).

BACKGROUND OF THE INVENTION

Currently, the manufacturers of motorcars and motorcar dealers have various types of vehicle covers, adapted to be used for protective purposes against atmospheric agents, acts of vandalism and accidental bumps; such accessories protect the exterior finishing and the body of the vehicle parked in car dealership depots or production plants.

The currently known covers comprise a protection sheet provided with perimetral, i.e. perimeter, constraint means, for example hooks, for the application of the sheet itself on the body of the motor vehicle, generally at the deck or mudguards.

Once covered by the aforementioned protection sheets, the motor vehicles are generally taken to the car dealerships or factory parking on truck trailers, or on trains, or on ships or other transport means. In many cases, during these movements the covered motor vehicles are outdoors exposed to wind and/or strong wind currents that develop during the movement of the means of transport. In such cases, and in particular under high speed conditions or in the presence of strong wind, the air manages to penetrate into the space between the protection sheet and the body and tends to inflate the sheet itself.

Therefore, the anchoring of the sheet under these conditions is strongly stressed and it may occur that the stress caused by the air inside the protection sheet is so strong to tear the sheet or break the anchoring of the same.

This especially occurs at the portion of the sheet that covers the roof of the motor vehicle and it is more frequent the more extensive the surface of the roof and the relative cover portion is.

As a matter of fact, in the case in which the motor vehicle to be covered is provided with a very extensive roof, such as for example in the case of SUVs or limousines, the volume of air between body and sheet is also very high. Thus, the force exerted by such air volume is greater than that exerted in the case of a sheet for protecting a runabout.

SUMMARY OF THE INVENTION

An object of the present invention is to overcome the aforementioned drawbacks and in particular to create a motor vehicle protection system capable of better resisting against the aforementioned air stresses than the known protection sheets without detaching from the body.

This and other objects according to the present invention are achieved by making a motor vehicle protection system as outlined in the claims.

BRIEF DESCRIPTION OF THE DRAWINGS

Characteristics and advantages of a motor vehicle protection system according to the present invention shall become more apparent from the following, exemplifying and non-limiting, description with reference to the attached schematic drawings, wherein:

FIG. 1 is a partial lateral schematic view of a motor vehicle covered by a motor vehicle protection system according to an embodiment of the present invention;

FIG. 2 is a detailed view of the motor vehicle protection system of FIG. 1 in an operating step. With reference to the figures, a motor vehicle protection system is shown, indicated in its entirety with 10.

DETAILED DESCRIPTION OF THE INVENTION

Such motor vehicle protection system 10 comprises a cover sheet 11 arranged to be anchored on a motor vehicle so as to cover the exterior body 20 thereof.

In the present description the expression exterior body indicates the painted metal surface and the glass parts of the body of the motor vehicle.

In particular, the exterior body 20, which reference is made to, comprises at least one roof 21 and two opposite sides 22, on each of which at least one window 23 is present.

According to the present invention, the cover sheet 11 is provided with at least one supplementary traction appendage 12 having a first end 13 constrained to the sheet itself 11 and a second end 14 adapted to be fixed through coupling means 15 on the body 20 so as to put in traction the sheet portion intended to cover the roof 21 of the motor vehicle downwards; in addition, the supplementary traction appendage 12, advantageously, extends starting from the sheet 11 so as to be interposed between the exterior body 20 and the sheet 11.

In particular, the at least one supplementary traction appendage 12 is constrained to the cover sheet 11 by sewing or heat sealing or gluing.

In the case in which just one supplementary traction appendage 12 is present, it may be constrained to the cover sheet 11 at one of the two sides of the motor vehicle and it may extend so as to pass below the vehicle itself and be fixed on the other side.

According to a preferred embodiment of the present invention, the supplementary traction appendages 12 are at least two and extend starting from the sheet 11 in directions opposite to each other in order to be fixed on the two opposite sides of said motor vehicle.

As illustrated in FIG. 1, the supplementary traction appendages 12 may be constrained to the cover sheet 11 at the portion intended to cover the roof of the motor vehicle and extend so as to be applied on the lateral windows or on a painted portion of the exterior body 20.

In these cases, advantageously, the coupling means 15 may comprise an adhesive band 15 adapted to be applied on the glass of a window and/or on a painted portion of the exterior body 20.

Alternatively or additionally to such adhesive band 15, the coupling means may comprise mechanical perimetral (perimeter) constraint means that can be engaged manually and reversibly for the application of the supplementary traction appendages 12 on the body 20. For example, such perimetral constraint means may be hooks that engage with the body at the mudguards.

Preferably, the cover sheet 11 has at least one inspection hole 17 adapted to allow a user to operate manually on the at least one supplementary traction appendage 12 in order to fix it on the body 20 once the cover sheet 11 has been applied on the motor vehicle.

In the particular embodiment illustrated in FIGS. 1 and 2, said inspection hole 17 can be closed and is provided with a closing hinge 18.

Alternatively, the inspection hole 17 may be, for example, closed through an adhesive or Velcro closing system (not illustrated).

The inspection holes 17 are thus made on the sheet 11 at the position of the supplementary traction appendages 12 which the cover sheet 11 itself is provided with.

The use of a motor vehicle protection system according to the present invention will be described hereinafter making reference to the illustrated embodiment for the sake of simplicity.

The cover sheet 11 is fitted on the motor vehicle, to the covering of which it is meant, and anchored thereto.

At this point, the closing hinge 18 may be opened allowing the user to diverge the relative inspection hole 17 in order to grasp the supplementary traction appendage 12 and to apply it on the window.

The characteristics and relative advantages of the motor vehicle protection system subject of the present invention are clear from the above description.

As a matter fact, the supplementary traction appendages further constrain the cover sheet to the motor vehicle putting in traction the cover portion of the roof downwards. This allows preventing, during the transport of the motor vehicle, such roof cover portion from being inflated with air until being torn and/or disengaged from the motor vehicle.

Lastly, it is clear that the motor vehicle protection system thus conceived is susceptible to numerous modifications and variants, all falling within the scope of protection of the invention; in addition, all details can be replaced by technically equivalent elements. In practice, the materials used, as well as the dimensions, may vary according to the technical requirements.

The invention claimed is:

1. Motor vehicle protection system, comprising a cover sheet arranged to be anchored on a motor vehicle so as to cover the body thereof wherein said body comprises at least one roof and two opposite sides, on each of which at least one window is present, said cover sheet having at least one supplementary traction appendage having a first end constrained to said cover sheet and a second end adapted to be fixed through coupling means on said body so as to put in traction the sheet portion intended to cover the roof of said motor vehicle downwards, said supplementary traction appendage extending starting from said cover sheet so as to be interposed between said body and said sheet, wherein said coupling means comprise an adhesive band adapted to be applied on the glass of a window and/or on a painted portion of said body.

2. Motor vehicle protection system according to claim 1 wherein the supplementary traction appendages are at least two and extend starting from said cover sheet in directions opposite to each other to be fixed on said two opposite sides of said motor vehicle.

3. Motor vehicle protection system according to claim 1 wherein said cover sheet has an inspection hole adapted to allow a user to operate manually on said supplementary traction appendage in order to fix it on said body once said sheet has been applied on said motor vehicle.

4. Motor vehicle protection system according to claim 3 wherein said inspection hole can be closed and is provided with a closing hinge.

* * * * *